US007119709B2

(12) United States Patent
Magner et al.

(10) Patent No.: US 7,119,709 B2
(45) Date of Patent: Oct. 10, 2006

(54) ELECTRONIC ACCESS SECURITY AND KEYLESS ENTRY SYSTEM

(75) Inventors: Dave Magner, Calmar, IA (US); Rick McIntosh, Altoona, IA (US); Julie M. Houdek, New Hampton, IA (US)

(73) Assignee: TRI/MARK Corporation, New Hampton, IA (US)

( * ) Notice: Subject to any disclaimer, the term of this patent is extended or adjusted under 35 U.S.C. 154(b) by 339 days.

(21) Appl. No.: 10/212,852

(22) Filed: Aug. 6, 2002

(65) Prior Publication Data

US 2004/0027237 A1 Feb. 12, 2004

(51) Int. Cl.

*G08C 19/00* (2006.01)
*G05B 19/00* (2006.01)
*G06F 7/00* (2006.01)
*H04B 1/00* (2006.01)
*H04L 9/14* (2006.01)

(52) U.S. Cl. .......................... 340/825.69; 340/825.72; 340/5.2; 340/5.5; 340/5.6

(58) Field of Classification Search ........... 340/825.69, 340/825.72, 5.2, 5.21, 5.22, 5.23, 5.24, 5.5–5.55, 340/5.6–5.67, 5.7, 5.72; 380/28, 270; 713/200
See application file for complete search history.

(56) References Cited

U.S. PATENT DOCUMENTS 4,205,325 A 5/1980 Haygood
4,206,491 A 6/1980 Ligman
4,488,056 A 12/1984 Mochida
4,688,036 A 8/1987 Hirano
4,742,327 A 5/1988 Burgess
4,942,393 A 7/1990 Waraksa
5,109,221 A 4/1992 Lambropoulos
5,113,182 A 5/1992 Suman
5,148,348 A 9/1992 White
5,252,960 A * 10/1993 Duhame .................... 340/5.64
5,278,547 A 1/1994 Suman
5,402,322 A 3/1995 Kunkler
5,442,341 A 8/1995 Lambropoulos
5,467,080 A 11/1995 Stoll
5,499,022 A * 3/1996 Boschini .................... 340/5.62
5,650,774 A 7/1997 Drori
5,669,522 A 9/1997 Million
5,767,588 A 6/1998 Nakaya
5,783,994 A * 7/1998 Koopman et al. ..... 340/426.36
5,907,195 A 5/1999 Issa
5,973,611 A 10/1999 Kuhla
6,031,465 A * 2/2000 Burgess ..................... 340/5.54

(Continued)

*Primary Examiner*—Wendy R. Garber
*Assistant Examiner*—Nam Nguyen
(74) *Attorney, Agent, or Firm*—McKee, Voorhees & Sease, P.L.C.

(57) ABSTRACT

A system for providing secured access to a vehicle, a remote communications device for sending a signal for controlling a first set of functions associated with the vehicle, a receiver associated with the vehicle and adapted to receive the signal, an access module operatively connected to the vehicle and adapted to provide control of a second set of functions of the vehicle by a user from outside of the vehicle, where the first set of functions may be similar or different from the second set of functions, a plurality of actuators disposed within the vehicle and wherein at least a portion of the first set of functions or at least a portion of the second set of functions are associated with at least one of the plurality of actuators and a controller module electrically connected to the receiver, the access module, and the plurality of actuators.

36 Claims, 5 Drawing Sheets

U.S. PATENT DOCUMENTS 6,084,317 A 7/2000 Wolfe
6,100,811 A * 8/2000 Hsu et al. .................. 340/5.83
6,169,379 B1 * 1/2001 Zhang et al. ............... 318/280
6,271,745 B1 * 8/2001 Anzai et al. ............... 340/5.53
6,577,928 B1 * 6/2003 Obradovich ................... 701/1
6,606,492 B1 * 8/2003 Losey ........................ 455/411

* cited by examiner

ELECTRONIC ACCESS SECURITY AND KEYLESS ENTRY SYSTEM

BACKGROUND OF THE INVENTION

This invention relates to secured access to vehicles. More specifically, this invention relates to a system for providing secured access to a vehicle using both a remote communications device such as a transmitter and an access module such as a vehicle-mounted keypad.

Keyless entry systems are widely used in cars and trucks. Typically, keyless entry systems include a key chain fob with several push buttons that lock and unlock doors, release a trunk latch, or activate a horn and/or lights associated with a panic function. The sophistication of such systems varies and other functions may be provided. This type of keyless entry is generally considered to be convenient and to promote safety.

Another type of electronic access system uses a door-mounted keyless entry system. In such a system, a keypad provides for access to a vehicle. A user typically provides an access code in order to gain entry into the vehicle.

Both the remote transmitter and the keypad entry system have their respective advantages. With the remote transmitter system, doors can be unlocked prior to an individual reaching the vehicle. In addition, the individual must have the remote transmitter or a key in order to gain access into the vehicle.

With the keypad, the user has the convenience that they need not carry the transmitter with them in order to access the vehicle. Where a keypad is used, they need only remember the proper combination.

Some attempts have been made in providing vehicles having both a transmitter and a keypad. One such example is U.S. Pat. No. 6,031,465. In addition, Ford offers certain of its vehicles with both a transmitter and a keypad.

Despite these prior art attempts, problems remain. In particular, current keyless access systems are limited in the functions, scale, and scope they provide. While some vehicles such as passenger cars may only require a few different functions others require increased functionality.

A further problem is that systems can consist of different components (including keypads, RF systems, and security systems) that are not compatible unless additional external components (including, but not limited to diodes, external relays, resistors) are used within the vehicle's wiring harness. This results in a complex and costly systems that provides for little opportunity for customization.

These problems are particularly apparent as they relate to non-automotive vehicles. Many vehicles are far more complicated than cars. For example, recreational vehicles (RVs), trucks, specialty vehicles, emergency vehicles, construction equipment, agricultural equipment and other types of vehicles may be large in nature and have numerous features or amenities that it would be useful and desirable to control without the operator being physically located in the drivers seat. These types of vehicles may have multiple entry doors, multiple compartments on the inside or outside of the vehicles, gas compartment doors, maintenance doors, various lighting fixtures on the inside or outside of the vehicle, and numerous other functions some of which may be highly specialized. These vehicles are more likely to need greater customization. Therefore reworking the wiring harness for each specific application is impractical and cost prohibitive.

Therefore, it is a primary object, feature, or advantage of the present invention to improve upon the state of the art.

Another object, feature or advantage of the present invention is to provide a keyless access system for a vehicle that can use both a remote and an access module such as a keypad physically attached to the vehicle.

Yet another object, feature, or advantage of the present invention is to provide a keyless access system for a vehicle that can be used to both sense or monitor states associated with the vehicle as well as to control functions of the vehicle.

A still further object, feature, or advantage of the present invention is to provide a keyless access system for a vehicle that has numerous functions, features or amenities for which keyless access is desired.

Another object, feature, or advantage of the present invention is to provide an integrated access system that is customizable in terms of outputs related to vehicle functions and inputs related to vehicle states without requiring redesign of the vehicle's wiring harness.

Yet another object, feature, or advantage of the present invention is the provision of an integrated access system that provides flexibility in the number and types of control outputs, and flexibility in the number and types of monitoring inputs.

These and other objects, features, and/or advantages of the present invention will become apparent from the specification and claims that follow.

SUMMARY OF THE INVENTION

The present invention is a system for providing secured access to a vehicle without requiring keys or requiring that the operator be inside of the vehicle. The present provides for both sensing inputs or states associated with the vehicle as well as controlling functions or outputs of the vehicle. The system is flexible and allows for customization without requiring reworking of the vehicle's wiring harness.

According to one aspect of the present invention, a system for providing secured access to a vehicle includes a remote communications device for sending a signal for controlling a first set of functions associated with the vehicle, a receiver associated with the vehicle and adapted to receive the signal, an access module operatively connected to the vehicle and adapted to provide control of the second set of functions of the vehicle by a user from outside of the vehicle, the first set of functions may be similar to or completely different from the second set of functions, a plurality of actuators disposed within the vehicle and wherein at least a portion of the first set of functions or at least a portion of the second set of functions are associated with at least one of a plurality of actuators, and a controller module electrically connected to the receiver, the access module, and the plurality of actuators. The access module can be a vehicle-mountable keypad accessible from outside of the vehicle. The system can include more than one access module. In addition, the system can include a plurality of sensors and/or switches associated with the vehicle and electrically connected to the controller module.

According to another aspect of the present invention a system for providing secured access to a vehicle is provided. The system includes a remote communications device for sending a signal for controlling a first set of vehicle functions associated with the vehicle, a receiver associated with the vehicle and adapted to receive the signal, a first access module operatively connected to the vehicle and adapted to provide control of a second set of vehicle functions of the vehicle by a user from outside of the vehicle, a plurality of zones associated with the vehicle, each of the zones having at least one electrically controlled switch, a first controller module electrically connected to the receiver, the first access module, and the at least one electronically controlled switch, the first set of vehicle functions associated with at least one of the plurality of zones, the second set of vehicle functions associated with at least one of the plurality of zones, and the first set of vehicle functions being different from the second set of vehicle functions.

DETAILED DESCRIPTION OF THE INVENTION

The present invention provides for a keyless access system for a vehicle. Although the term "keyless entry" system is more commonly used, the term "keyless access" system is used herein because the present invention provides for vehicle functions beyond merely entry into the vehicle.

Figure 1:
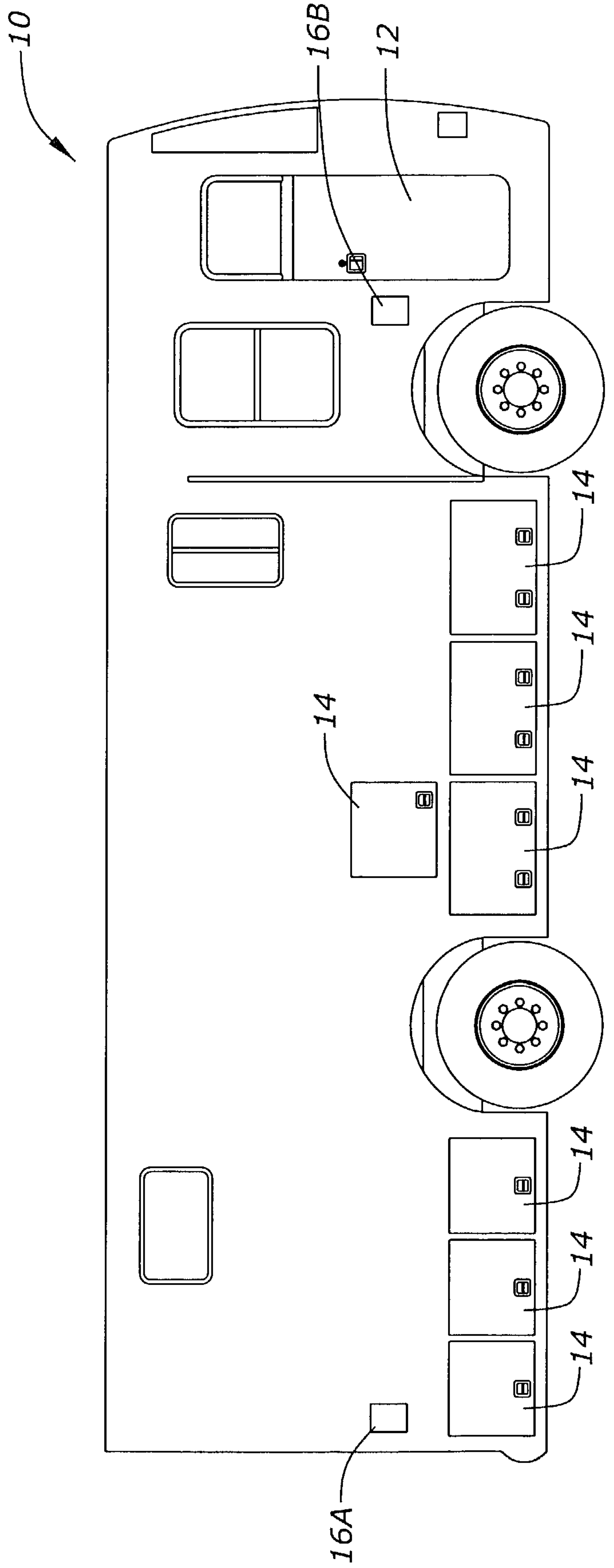
FIG. 1 is a side view of a vehicle equipped with a secured access system according to one embodiment of the present invention.

FIG. 1 illustrates a vehicle 10 according to one embodiment of the present invention. The vehicle 10 shown is an RV, however, the present invention is in no way limited for use in an RV. The present invention can be used in numerous applications, including vehicles such as semi-truck tractors, ambulances, construction equipment, and other types of vehicles. The vehicle 10 shown has a passenger door 12 and a number of different compartment doors 14. The compartment doors 14 are spread out along the passenger side of the vehicle 10. Two different access modules 16 are also shown. The access modules 16A and 16B can be keypads. Access modules 16A and 16B are located on different ends of the vehicle 10 with access module 16B being located approximately the passenger door 12 and access module 16A being located approximately the rear most compartment doors 14. Although only two access modules 16A and 16B are shown, the present invention contemplates that numerous access modules can be provided. The access modules 16A and 16B can be keypads that require a security code prior to being used to control vehicle functions. Alternatively, the present invention contemplates that the access modules can otherwise provide for secured access. For example, biometric systems, including, but not limited to finger print access systems or retinal scanning systems can be used. Further, various transponder or transceiver systems could also be used.

Either access module 16A and/or 16B can be used to control vehicle functions. This allows an operator to fully control vehicle functions from either location. For example, an operator of the vehicle 10 can use access module 16B to unlock the passenger door 12 and enter the vehicle 10. The operator can also use the access module 16A to open various compartment doors 14, including the rear most doors 14. The present invention also provides for any number of sensors or switches to be placed throughout vehicle 10. These sensors or switches can include, without limitation, door ajar switches, interior lock/unlock (momentary rocker) manual switches, and other types of switches.

Figure 2:
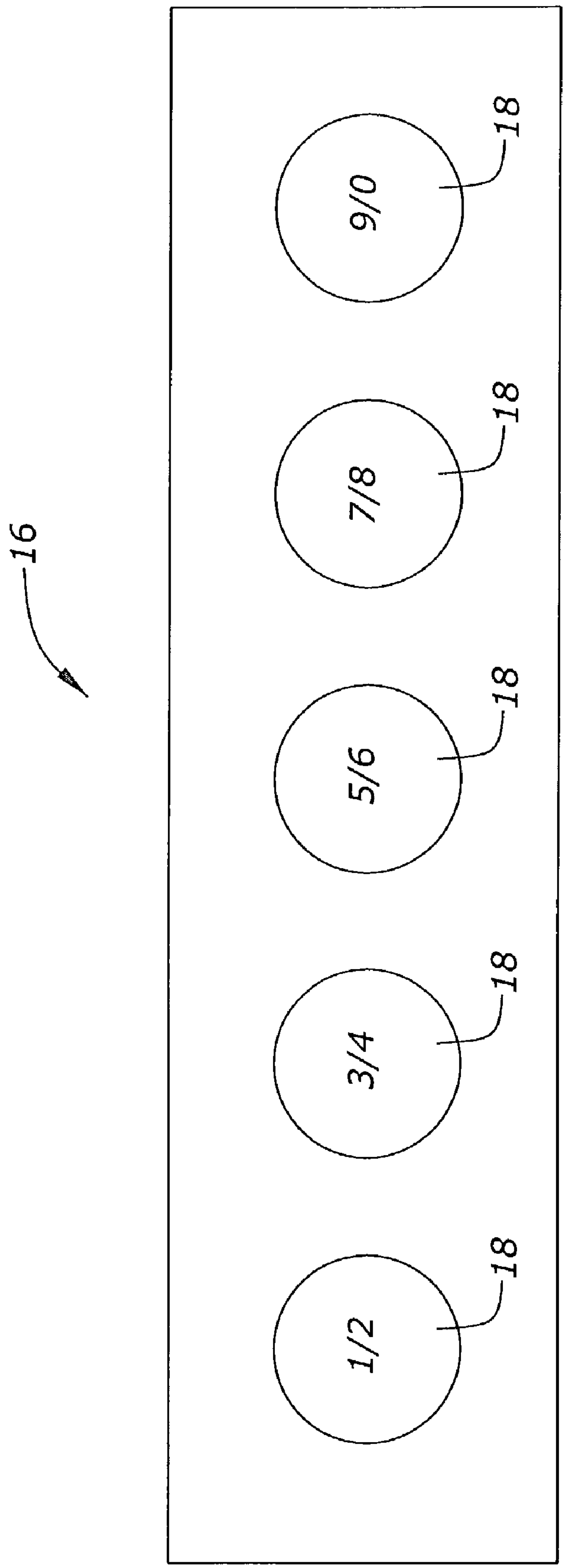
FIG. 2 is a front view of one access module according to one embodiment of the present invention.

FIG. 2 provides one embodiment of an access module 16 of the present invention. In the access module 16, a plurality of buttons 18 are shown. The operator can enter an access code into the access module 16 prior to specifying particular vehicle functions. To facilitate the entry of a code, each of the buttons 18 can be labeled such as with one or more numbers as shown. The access module 16 may be mounted vertically or horizontally onto the vehicle 10. Preferably, the buttons 18 provide both visual feedback through back lighting or other means as well as tactile feedback and audible feedback so that an operator can be certain as to which buttons 18 have been pressed.

Figure 3:
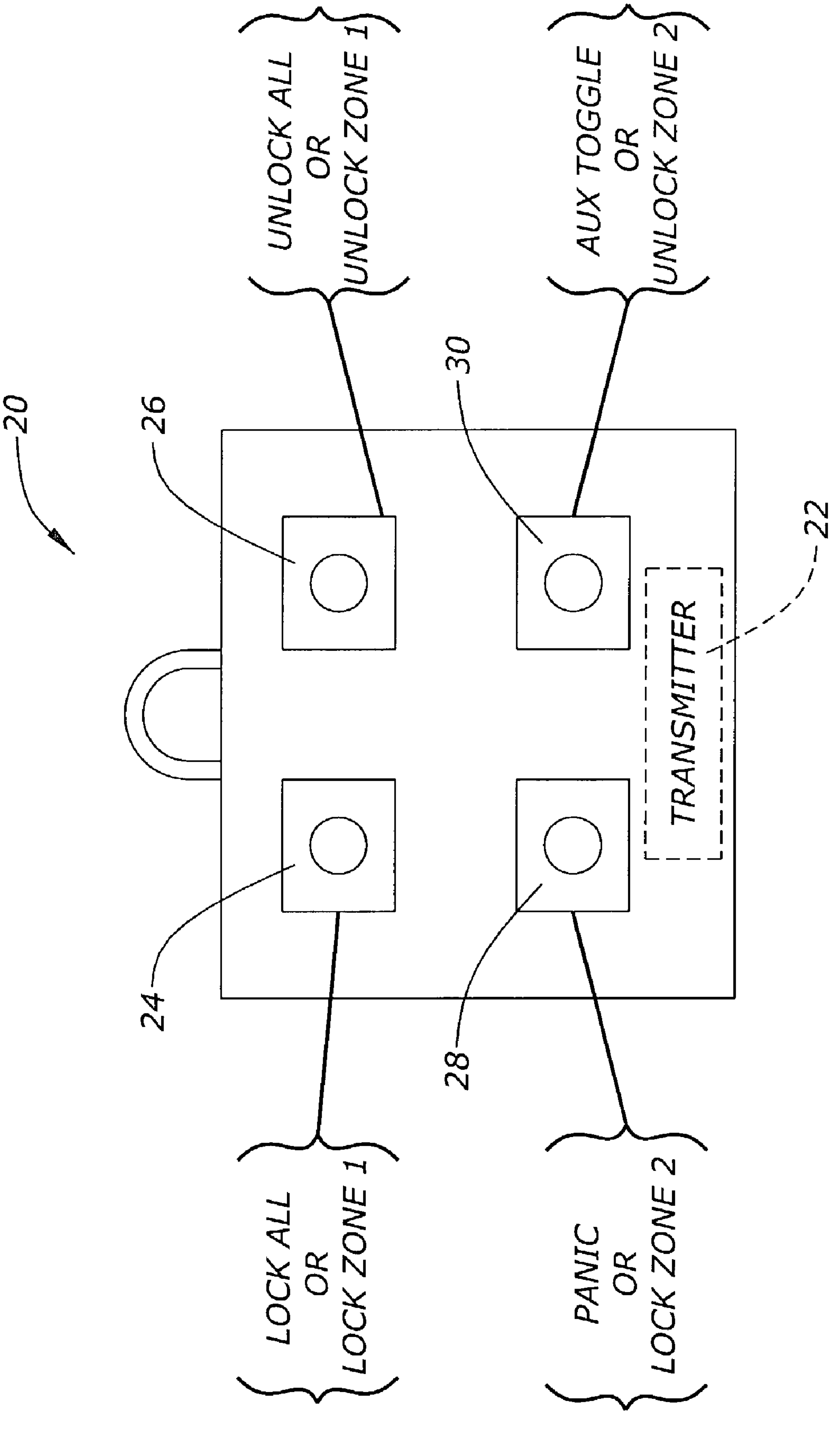
FIG. 3 is a front view of a key fob transmitter according to one embodiment of the present invention.
Figure 4:
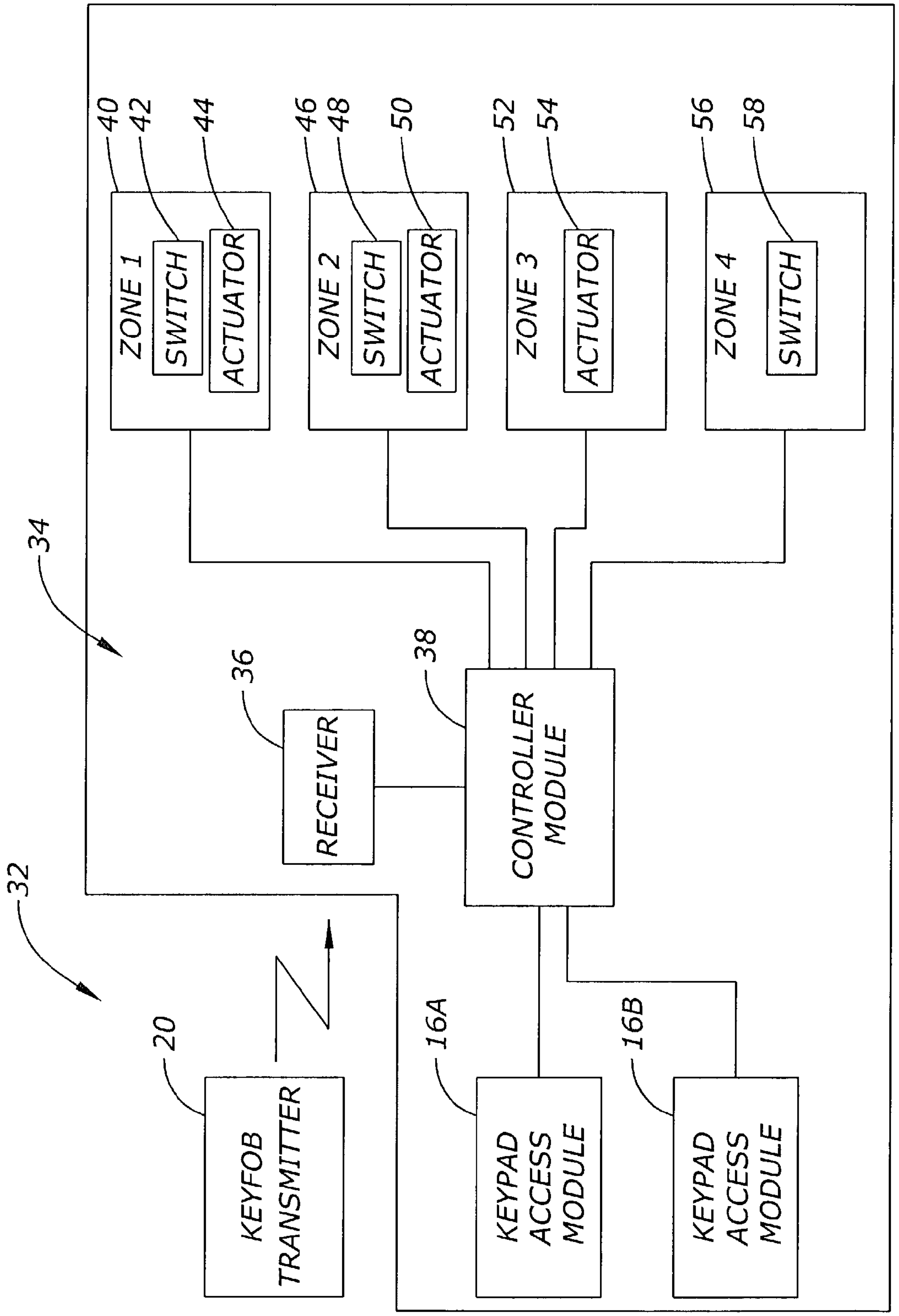
FIG. 4 is a block diagram of a keyless access system according to one embodiment of the present invention.

FIG. 3 provides a front view of a key fob transmitter 20 according to one embodiment of the present invention. The key fob transmitter 20 is available from various sources. The key fob transmitter 20 includes buttons 24, 26, 28, and 30. The buttons 24, 26, 28, and 30 are associated with different vehicle functions. For example, button 24 can be associated with a function to lock all doors or to lock only those locks associated within a particular zone of the vehicle. Similarly, the button 26 can be used to unlock all the doors or unlock locks associated with a zone of a vehicle. The button 28 can be used to toggle an auxiliary function or to lock a second zone of the vehicle. The button 30 can be used as panic button, such as to activate the vehicle horn or lights or to unlock a second zone of the vehicle. In addition, a transmitter 22 is a part of the key fob 20 device. Although a keyfob transmitter is shown, the present invention contemplates that other types of transmitters or transponders can be used in a remote system. Preferably, the remote transmitter is a code-hopping, rolling code, or code swapping transmitter in order to improve the security of the system. A transmitter is merely one type of remote communications device that can be used. The present invention also contemplates that a transponder, proximity device, or other remote communications device can be used FIG. 4 provides a block diagram according to one embodiment of the present invention. An electronic access system 32 is shown. The system 32 includes a key fob transmitter unit 20 and a vehicle subsystem 34. The vehicle subsystem 34 includes a receiver 36 in communication with the key fob transmitter 20. The key fob transmitter 20 communicates with the receiver 36 through RF communications or otherwise. The receiver 36 is electrically connected to a controller module 38. A controller module 38 is also connected to one or more access modules 16A and 16B. The access modules may be keypad access modules, however, the present invention contemplates that instead of using buttons for entering a security code and controlling functions, other types of access may be provided. In addition to these inputs, the controller module 38 includes a number of outputs. The controller module 38 is used to control a plurality of zones. A zone is a grouping of acuators or other electronic switches associated with a vehicle and vehicle functions. For example, various switches can be used to control lighting, various actuators can be used to control locking and unlocking compartment doors or entry doors, opening doors, or other vehicle functions. For illustrative purposes, a first zone 40 is shown containing both a switch 42 and an actuator 44. A second zone 46 is shown containing both a switch 48 and an actuator 50. A third zone 52 is shown containing an actuator 54 and a fourth zone 56 is shown containing a switch 58. The present invention contemplates numerous zones and within each zone the present invention contemplates that any number of electronic switches and/or actuators may be used.

Figure 5:
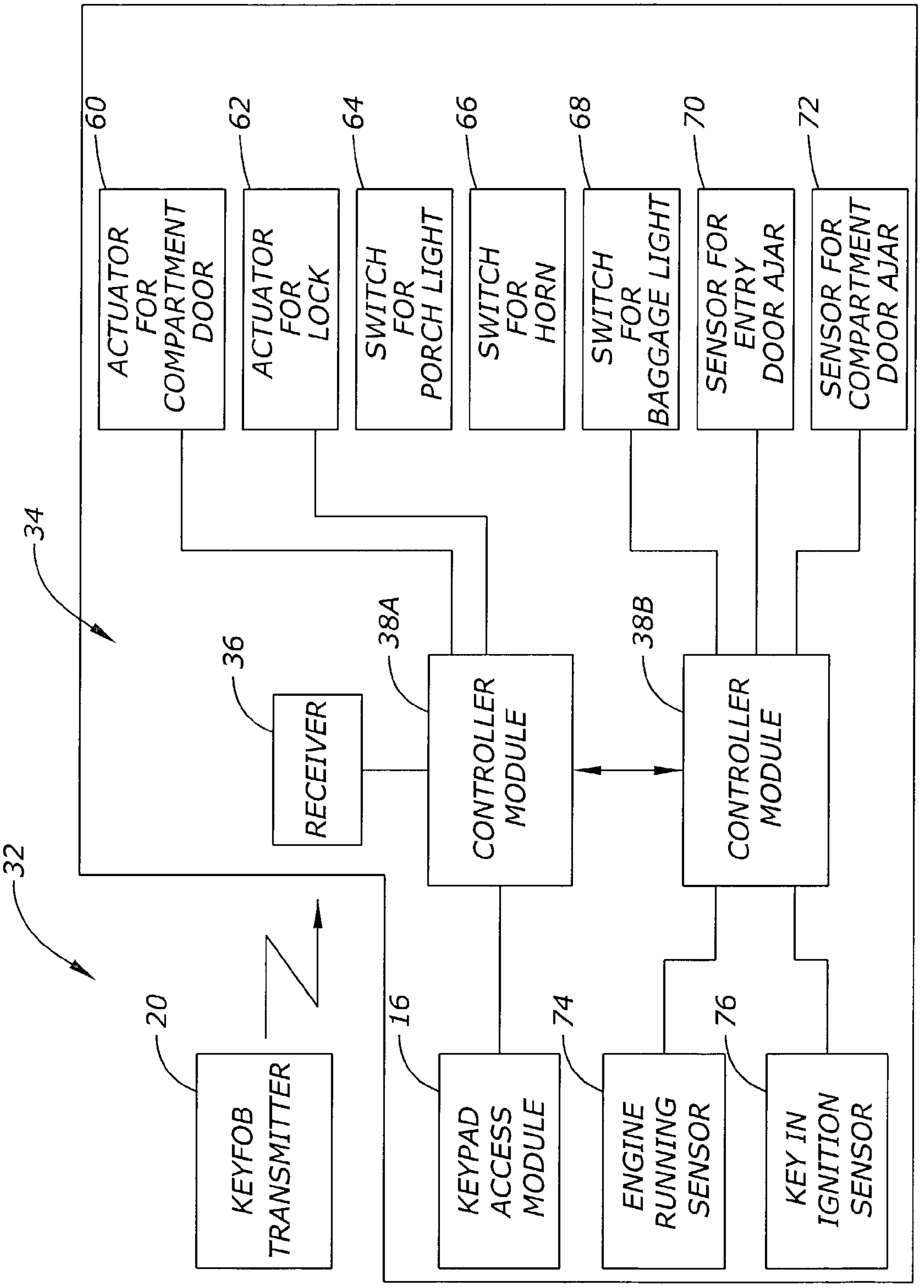
FIG. 5 is a block diagram of a keyless access system according to another embodiment of the present invention.

FIG. 5 provides another embodiment of the present invention. In FIG. 5, multiple controller modules are shown. A first controller module 38A and a second controller module 38B are shown. The present invention contemplates that numerous controller modules 38 can be used. Where more than one controller module 38 is used, the controller modules 38 can communicate through network communication. By daisy chaining the controller modules 38, additional inputs and outputs to the access system can be provided.

The present invention provides for communication between controller modules 38. In one embodiment, each controller modules can send multiplexed messages to and from other controller modules. This allows a system of the present invention to provide for expansion in that additional inputs and/or outputs can be used. The present invention provides for network communication between controller modules. Many protocols and/or message formats may be used. According to one embodiment a physical layer based on the J1708 standard is used. The messages sent begin with an 'STX' (02H) character and end with an 'ETX' character. These are transmitted at 2400 baud with 8 data bits and 1 stop bit. Various commands can then be used as may be appropriate in a particular environment or application. The commands can include commands to learn and/or change programming, commands that will change security codes, commands that will lock all doors, commands to unlock a particular zone, commands to unlock all zones, commands to toggle an auxiliary output, commands to send a pulse output, commands to change the status (for example to change between a secure mode and an unsecure mode), commands to indicate errors, and commands to issue a wakeup to particular devices.

The present invention further allows for particular vehicle outputs to be enabled or disabled. For example, in specialized vehicles, there is various equipment associated with the vehicle. Such equipment can include motor or hydraulic controlled equipment such as winches, booms, and other equipment. The present invention allows for messages to be used to enable or disable particular equipment. This can be for safety reasons, or other appropriate reasons.

The present invention further provides for multiple user codes to be used. Each user code can be associated with different sets of vehicle functions. This allows different users to have access to different vehicle functions. Each user code can have more access, less access, or different access to vehicle functions than other user codes. For example, where the vehicle is an ambulance and has a compartment containing pharmaceuticals, a person who is only a driver for the vehicle would not need access to the compartment and therefore would not be able to unlock the compartment door using their user code. In another example, a particular vehicle compartment can be designated to be accessible only by service personnel with an appropriate code. The present invention contemplates any number of examples involving any number of different vehicles, especially specialized vehicles, and any number of types of users where there is reason to provide different users with different types of access to vehicle functions. In this manner, the present invention further provides for additional customization of features by providing flexibility based on the vehicle functions of the specific vehicle and the types of users who will have access to the vehicle functions.

The present invention also provides for low power consumption. The control module 38 includes power management features to reduce power consumption. The present invention contemplates that a vehicle of the present invention can be seasonal and therefore may have long periods (i.e. months) without use. Thus, low power consumption is particularly important. In addition, the access module includes power management. The power management features of the present invention allow for power consumption to be reduced when the system is idle.

As shown in FIG. 5, the present invention provides for inputs such as sensors or switches to be used in addition to outputs. The first controller module 38A in FIG. 5 is electrically connected to an actuator 60 associated with a compartment door, an actuator 62 associated with an entry door lock, a switch for a porch light 64, a switch for the horn 66. The second controller module 38B is electrically connected to a switch or a baggage light 68, a sensor for an entry door ajar 70, a sensor for a compartment door ajar 72, an engine running sensor 74, and a key in ignition sensor 76.

Thus each controller module 38 can be used in conjunction with both inputs and outputs. The present invention contemplates that the controller module 38 can also communicate with other aspects of the vehicle. The present invention can easily be expanded through the addition of access modules and/or controller modules. The structure of the present invention allows it to easily accommodate the wiring harness of a specialized vehicle so that the system can be placed in a vehicle without requiring redesign of the vehicle's wiring harness. The system of the present invention therefore provides a convenient, flexible, and customizable means for providing secured access to a vehicle, for controlling vehicle functions, and monitoring vehicle states.

Thus, an electronic access system has been disclosed. The present invention contemplates numerous variations in the particular vehicle functions provided, variations in the specific inputs and outputs provided, the communication between controller modules, the number and type of access modules, and the types of vehicle used. These and other variations are well within the spirit and scope of the invention.

What is claimed is:

1. A system for providing secured access to a vehicle having a wiring harness, comprising:

a remote communications device for sending a signal for controlling a first set of functions associated with the vehicle;

a receiver associated with the vehicle and adapted to receive the signal;

an access module operatively connected to the vehicle and adapted to provide access to control of a second set of functions of the vehicle by a user;

a plurality of actuators disposed within the vehicle and wherein at least a portion of the first set of functions and at least a portion of the second set of functions are associated with at least one of the plurality of actuators;

a controller module electrically connected to the receiver, the access module, and the plurality of actuators; and wherein the second set of functions is customizable using commands for changing programming and configurable without reworking of the wiring harness of the vehicle.

2. The system of claim 1 wherein the first set of functions is a sub set of the second set of functions.

3. The system of claim 1 wherein the vehicle includes a plurality of zones and wherein at least one of the plurality of actuators is associated with each of the zones.

4. The system of claim 1 wherein the remote communications device is housed in a key chain fob.

5. The system of claim 1 further comprising a second access module operatively connected to the vehicle, the second access module electrically connected to the controller module and wherein at least one of the plurality of actuators disposed within the vehicle is associated with a third set of functions, and wherein the second access module is a vehicle mounted keypad accessible from outside the vehicle.

6. The system of claim 5 wherein the third set of functions is different from the first and second sets of functions.

7. The system of claim 1 wherein at least one of the actuators is associated with a compartment door.

8. The system of claim 1 further comprising a plurality of sensors associated with the vehicle and electrically connected to the controller module.

9. The system of claim 1 further comprising a plurality of switches disposed within the vehicle and electrically connected to the controller module.

10. The system of claim 1 further comprising a second controller module in network communication with the controller module.

11. The system of claim 1 wherein the controller module is adapted to enable or disable a vehicle function.

12. A configurable system suitable for providing secured access to a plurality of vehicle types including recreational vehicles, trucks, specialty vehicles, emergency vehicles, construction vehicles, and agricultural vehicles and wherein each vehicle has a plurality of zones associated with inputs and outputs to be controlled by the configurable system the configurable system comprising:

- a remote communications device for sending a signal for controlling a first set of vehicle functions associated with the vehicle;
- a receiver associated with the vehicle and adapted to receive the signal;
- a first access module operatively connected to the vehicle and adapted to provide control of a second set of vehicle functions of the vehicle by a user;
- each of the plurality of zones having at least one electronically controlled switch;
- a first controller module electrically connected to the receiver, the first access module, and the at least one electronically controlled switch;
- the first set of vehicle functions associated with at least one of the plurality of zones and specific to the type of vehicle;
- the second set of vehicle functions associated with at least one of the plurality of zones and specific to the type of vehicle;
- the first set of vehicle functions at least partially different from the second set of vehicle functions;
- wherein the first access module is positioned proximate the at least one of the plurality of zones associated with the second set of vehicle functions; and
- wherein the controller module is configured to the inputs and outputs associated with the type of vehicle to perform the first set of vehicle functions and the second set of vehicle functions.

13. The system of claim 12 wherein the at least one electronically controlled switch is an actuator.

14. The system of claim 13 wherein the vehicle functions include locking a first door and unlocking the first door using the actuator.

15. The system of claim 13 wherein the vehicle functions include opening a first compartment using the actuator.

16. The system of claim 13 wherein the vehicle functions include switching a light on or off.

17. The system of claim 12 further comprising a second access module for providing a third set of vehicle functions, the third set of functions associated with at least one of the plurality of zones, the third set of vehicle functions different from the first set of vehicle functions and the second set of vehicle functions, and wherein the second access module is a vehicle mounted keypad accessible from outside the vehicle.

18. The system of claim 12 further comprising a second controller module in network communication with the first controller module.

19. The system of claim 12 further comprising at least one sensor electrically connected to the first controller module.

20. The system of claim 19 wherein the at least one sensor is adapted for detecting that a vehicle door is ajar.

21. The system of claim 19 wherein the at least one sensor is adapted for detecting that a vehicle engine is running.

22. The system of claim 19 wherein the at least one sensor is adapted for detecting that a key is in the ignition.

23. The system of claim 19 wherein the vehicle functions include disabling the remote transmitter.

24. The system of claim 19 wherein the controller module is adapted to enable or disable a vehicle function.

25. A configurable system for providing secured access to a vehicle having a wiring harness, comprising:

- a remote communications device for sending a signal for controlling a first set of vehicle functions;
- a receiver associated with the vehicle and adapted to receive the signal;
- an access module operatively connected to the vehicle and adapted to provide control of a second set of vehicle functions by a user from outside of the vehicle; a plurality of electronic devices associated with the vehicle and wherein at least a portion of the first set of functions or at least a portion of the second set of functions are associated with at least one of the plurality of electronic devices;
- at least one sensor for monitoring a vehicle state;
- a controller module electrically connected to the receiver, the access module, the plurality of electronic devices, and the at least one sensor;
- wherein the controller module is configured to accommodate the plurality of electronic devices and the at least one sensor to monitor the vehicle state and control the second set of vehicle functions to receive feedback and provide a system response;
- wherein the second set of functions associated with the access module are configurable without reworking of the wiring harness.

26. The system of claim 25 wherein the at least one electronically controlled device is an actuator.

27. The system of claim 25 wherein the vehicle functions include locking a first door and unlocking the first door using the actuator.

28. The system of claim 25 wherein the vehicle functions include opening a first compartment using the actuator.

29. The system of claim 25 wherein the vehicle functions include switching a light on or off.

30. The system of claim 25 further comprising a second access module for providing a third set of vehicle functions, the third set of functions associated with at least one of the plurality of zones.

31. The system of claim 25 further comprising a second controller module in network communication with the first controller module.

32. The system of claim 25 wherein the at least one sensor is adapted for detecting that a vehicle door is ajar.

33. The system of claim 25 wherein the at least one sensor is adapted for detecting that a vehicle engine is running.

34. The system of claim 25 wherein the at least one sensor is adapted for detecting that a key is in the ignition.

35. The system of claim 25 wherein the vehicle functions include disabling the remote transmitter.

36. The system of claim 25 wherein the at least one sensor is a switch.

* * * * *